United States Patent
Saitsu (10) Patent No.: US 11,490,012 B2
(45) Date of Patent: Nov. 1, 2022

(54) CONTROL APPARATUS FOR CORRECTING BLUR, LENS APPARATUS, IMAGING APPARATUS, CONTROL METHOD, AND STORAGE MEDIUM

(71) Applicant: CANON KABUSHIKI KAISHA, Tokyo (JP)

(72) Inventor: Kenji Saitsu, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 151 days.

(21) Appl. No.: 16/865,663

(22) Filed: May 4, 2020

(65) Prior Publication Data

US 2020/0366846 A1 Nov. 19, 2020

(30) Foreign Application Priority Data

May 14, 2019 (JP) .............................. JP2019-091070

(51) Int. Cl.
H04N 5/232 (2006.01)
(52) U.S. Cl.
CPC ..... *H04N 5/23287* (2013.01); *H04N 5/23254* (2013.01); *H04N 5/23258* (2013.01)
(58) Field of Classification Search
None
See application file for complete search history.

(56) References Cited

U.S. PATENT DOCUMENTS

| | | | |
|---|---|---|---|
| 6,734,902 B1 | 5/2004 | Kawahara | |
| 2005/0128309 A1* | 6/2005 | Tomita | H04N 5/23248 348/208.7 |
| 2014/0184834 A1 | 7/2014 | Miyasako | |
| 2014/0184836 A1* | 7/2014 | Watanabe | H04N 5/23287 348/208.5 |
| 2015/0373282 A1 | 12/2015 | Ishii | |
| 2018/0213155 A1 | 7/2018 | Takayanagi | |

FOREIGN PATENT DOCUMENTS

| | | |
|---|---|---|
| CN | 108337428 A | 7/2018 |
| JP | 2002016836 A | 1/2002 |
| JP | 2002214659 A | 7/2002 |
| JP | 3610210 B2 | 1/2005 |
| JP | 2018078582 A | 5/2018 |
| JP | 2018205551 A | 12/2018 |

OTHER PUBLICATIONS

Extended European Search Report issued in European Appln. No. 20173378.9 dated Aug. 25, 2020.
Office Action issued in Chinese Appln. No. 202010401032.8 dated Feb. 15, 2022. English translation provided.

* cited by examiner

*Primary Examiner* — Quan Pham
(74) *Attorney, Agent, or Firm* — Rossi, Kimms & McDowell LLP (57) ABSTRACT

A control apparatus includes a first acquirer configured to acquire first blur information based on a motion vector calculated using an imaging signal from an image sensor, a second acquirer configured to acquire second blur information based on a blur signal from a blur detector, and a controller configured to control driving of an image stabilizing element in accordance with third blur information obtained by using the first blur information and the second blur information. A weight for the first blur information in acquiring the third blur information is determined based on a comparison between the first blur information and the second blur information.

18 Claims, 5 Drawing Sheets

CONTROL APPARATUS FOR CORRECTING BLUR, LENS APPARATUS, IMAGING APPARATUS, CONTROL METHOD, AND STORAGE MEDIUM

BACKGROUND OF THE INVENTION

Field of the Invention

The present invention relates to a control apparatus, a lens apparatus, and an imaging apparatus, each of which can perform an image stabilization.

Description of the Related Art

In recent years, various image stabilizing mechanisms have been proposed for correcting blurs in a captured image, which are caused by hand shakes and the like applied to an optical apparatus such as a digital camera and a video camera. The image stabilizing mechanism performs deblurring by shifting an optical axis position of an optical system in accordance with an output from a sensor such as a gyro sensor detecting a shake angular velocity. One widely used method for shifting the optical axis position is to move an image sensor or part of an imaging lens (image capturing lens) in a direction orthogonal to the optical axis.

A method is known for detecting, as a motion vector (motion vector amount), a blur residual after the image stabilization performed by the image stabilizing mechanism, from an image by an image sensor. The motion vector is obtained by detecting a feature point in each image as a motion amount for each frame. Thereby, a moving speed on an image plane of the image sensor can be calculated by dividing the motion vector by the time between the frames. Further, once the actual focal length of the imaging optical system is found, the moving speed on the image plane can be converted into an angular velocity based on the relationship of fxtanO, so that the angular velocity of the blur residual can be detected by using the motion vector amount.

Japanese Patent No. ("JP") 3610210 discloses an imaging apparatus that performs a more accurate image stabilization by detecting, as motion vector information, a blur residual amount after the image stabilization performed by using an optical image stabilizer, and by feeding back the motion vector information as a target value for the image stabilizer.

In the imaging apparatus disclosed in JP 3610210, the blur residual amount detected as the motion vector basically needs to be vector information a still object. If the imaging apparatus detects a motion vector of a moving object and feeds it back to the optical image stabilizer, the image stabilizer is driven so as to follow the moving object, and thus it is impossible to perform a highly accurate image stabilization. Namely, in this method, it is important to accurately detect the motion vector of the still object, that is, a background motion vector, and thus if the object is the moving object, it is difficult to accurately detect the background motion vector.

SUMMARY OF THE INVENTION

The present invention provides a control apparatus, a lens apparatus, an imaging apparatus, a control method, and a storage medium, each of which can perform a highly accurate image stabilization.

A control apparatus according to one aspect of the present invention includes a first acquirer configured to acquire first blur information based on a motion vector calculated using an imaging signal from an image sensor, a second acquirer configured to acquire second blur information based on a blur signal from a blur detector, and a controller configured to control driving of an image stabilizing element in accordance with third blur information obtained by using the first blur information and the second blur information. A weight for the first blur information in acquiring the third blur information is determined based on a comparison between the first blur information and the second blur information.

A control apparatus as another aspect of the present invention includes a first acquirer configured to acquire first blur information based on a motion vector calculated using an imaging signal from an image sensor, a second acquirer configured to acquire second blur information based on a blur signal from a blur detector, and a controller configured to control driving of an image stabilizing element. In accordance with a result of a comparison between the first blur information and the second blur information, the controller performs a first control for driving the image stabilizing element based on the third blur information obtained by using the first information and the second information, or performs a second control for driving the image stabilizing element based on the second blur information.

A lens apparatus and an imaging apparatus including above control apparatus, a control method corresponding to the control apparatus, and a storage medium storing a computer program that enables a computer to execute the control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
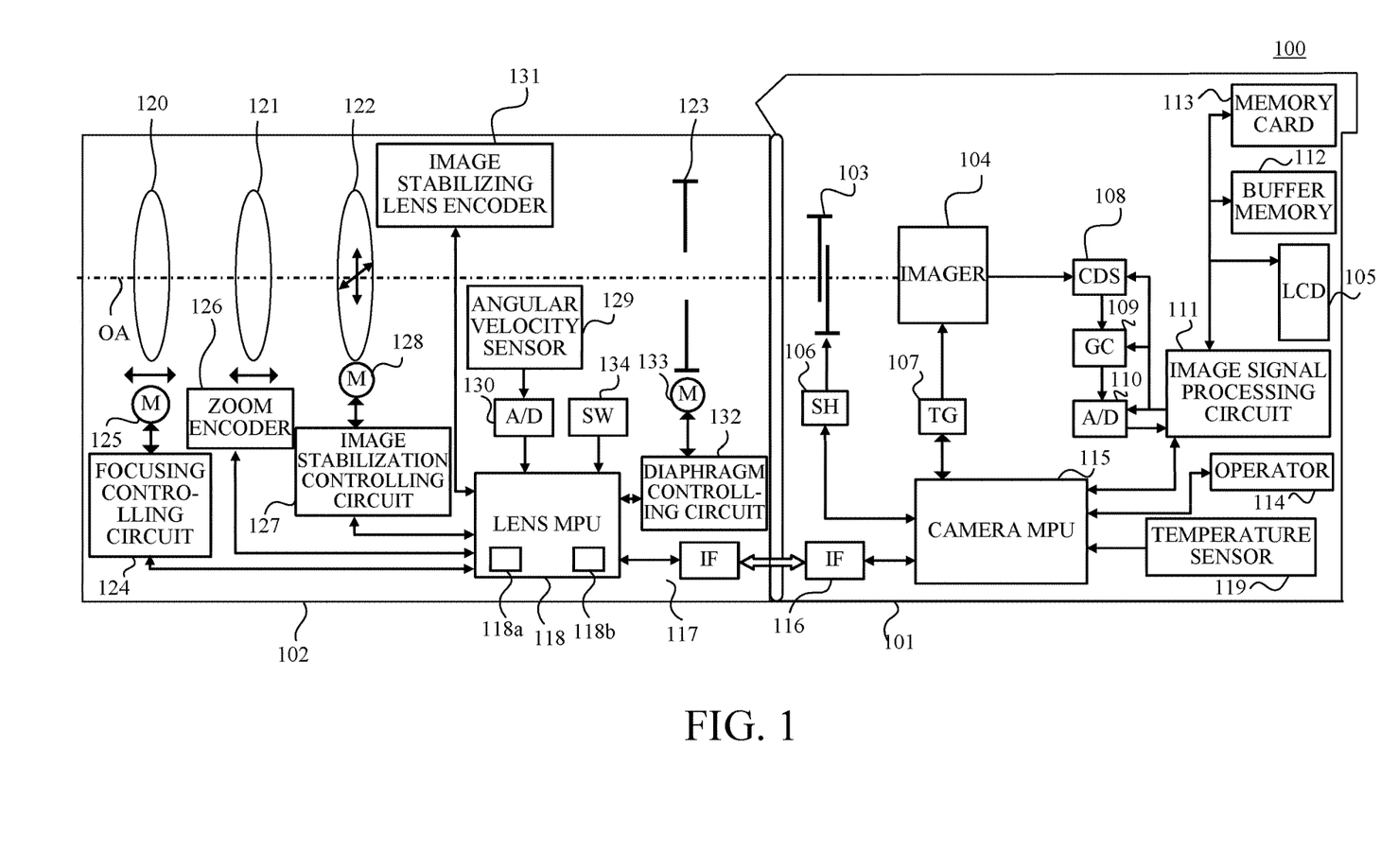
FIG. 1 is a block diagram illustrating a camera system according to each embodiment.

Firstly, a description will be given of a configuration of a camera system (imaging system) in this embodiment with reference to FIG. 1. A camera system (imaging system) 100 includes a camera body (imaging apparatus) 101 and an interchangeable lens (lens apparatus) 102 detachably attachable to and communicable with the camera body 101.

Before an imaging operation (image capturing operation) (during so-called aiming), a focal plane shutter 103 is opened, and an imaging light beam (image capturing light beam) from an object passes through an imaging optical system of the interchangeable lens 102 and forms an image on an imager (imaging unit) (image sensor) 104. An LCD 105 displays the image formed on the imager 104. Thereby, a user can view the object image during the aiming. The imager 104 is a CMOS sensor, and photoelectrically converts the object image (optical image) formed via the imaging optical system.

When an imaging operation starts (an operation for starting a still image exposure), the shutter driving circuit 106 drives the focal plane shutter 103. A shutter operation before the exposure differs depends on a camera setting. For example, when the setting is to perform a front-curtain mechanical-shutter operation, the focal plane shutter 103 closes before the exposure, the imager 104 resets the accumulated signal, then the focal plane shutter 103 opens, and exposure processing starts. On the other hand, when the setting is to perform a front-curtain electronic-shutter operation, while the focal plane shutter 103 does not close, the imager 104 resets the accumulation signal, and the exposure processing starts. When the exposure processing starts, the imaging light beam forms an image as a captured optical image on the imager 104. The imager 104 photoelectrically converts the captured optical image into an imaging signal.

A timing generator 107 controls an accumulating operation, a reading out operation, a resetting operation, and the like of the imager 104. A CDS circuit 108 (correlated double sampling circuit) is configured to reduce accumulated charge noises of the imager 104. A gain controlling circuit 109 is configured to amplify the imaging signal. An A/D converter 110 is configured to convert the amplified imaging signal (analog signal) into image data of a digital signal. An image signal processing circuit (vector calculator) 111 is configured to perform signal processing such as filtering processing, color converting processing, and gamma processing for the image data digitized by the A/D converter 110. The image signal processing circuit 111 is configured to calculate (generate) a motion vector (motion vector information) using the imaging signal from the imager 104 and to output the motion vector to a camera MPU 115. The image signal processed by the image signal processing circuit 111 is stored on a buffer memory 112, displayed on the LCD 105, and/or recorded on a detachably attachable memory card 113.

An operator 114 includes switches or the like configured to set an imaging mode (image capturing mode), a size of a recorded image file, a size of a captured motion image, a frame rate, to perform a release during the capturing of a still image, to start/stop of recording of a motion image, and the like. When the user selects a motion image mode as the imaging mode via the operator 114, the focal plane shutter 103 opens and the image is converted into the image signal by signal processing performed basically in the same order as that of the still image exposure. When the motion imaging starts by the user operating the operator 114, the motion image is formed by connecting the image signals, and the memory card 113 stores the captured motion image.

The camera MPU (control apparatus) 115 is configured to control each operation of the camera body 101 described above. The camera MPU 115 is configured to mutually communicate with a lens MPU 118 via an interface circuit (camera-side interface circuit) 116 of the camera body 101 and an interface circuit (lens-side interface circuit) 117 of the interchangeable lens 102. In this communication, various data is exchanged between the camera body 101 and the interchangeable lens 102. The camera MPU 115 includes a calculator configured to calculate a distortion correction value for a rolling shutter. The distortion correction value is input to a rolling shutter distortion correcting unit in the image signal processing circuit 111, and distortion correcting processing is performed.

A temperature sensor 119 is a temperature sensor such as a thermistor. An output signal from the temperature sensor 119 is input to the camera MPU 115 and used for controlling the camera, or input to the lens MPU 118 via the interface circuits 116 and 117 and used for controlling the lens.

The interchangeable lens 102 includes, as part of the imaging optical system, a focusing lens 120, a zooming lens 121, an image stabilizing lens (image stabilizing element) 122, and a diaphragm (aperture stop) 123. The focusing lens 120 is driven in a direction along the optical axis OA (optical axis direction) via a focusing controlling circuit 124 and a focusing lens driving motor 125 in accordance with a controlling signal from the lens MPU 118. The focusing controlling circuit 124 includes a driving circuit configured to drive the focusing lens 120 and a focus encoder configured to output a zone pattern signal and a pulse signal according to the movement of the focusing lens 120. The focus encoder can detect an object distance.

The zooming lens 121 moves in the optical axis direction when the user operates a zoom operation ring (not illustrated). A zoom encoder 126 outputs the zone pattern signal according to the movement of the zooming lens 121. The lens MPU 118 acquires the magnification of the captured image by obtaining signals from the focus encoder and the zoom encoder 126 and by reading out previously stored magnification data of captured image according to a combination of the obtained object distance and focal length.

The image stabilizing lens 122 is driven, via an image stabilization controlling circuit 127 and a linear motor 128, in a direction different from the optical axis direction, such as a direction orthogonal to the optical axis OA. The image stabilization is performed as follows. The angular velocity sensor 129 as a blur detector detects a rotational blur applied to the interchangeable lens 102 and outputs an angular velocity signal representing a degree of the rotational blur. Hereinafter, the angular velocity signal output from the angular velocity sensor 129 will also be referred to as a blur signal. The angular velocity sensor 129 is, for example, a gyro sensor. An A/D converter 130 converts the detected blur signal output from the angular velocity sensor 129 into a digital signal, and inputs the digital signal to the lens MPU 118.

The lens MPU 118 performs various signal processing and calculates a driving target signal for the image stabilizing lens. The lens MPU 118 outputs, to the image stabilization controlling circuit 127, a driving signal according to a difference between the driving target signal for the image stabilizing lens and a position signal of the image stabilizing lens output from the image stabilizing lens encoder 131. As described above, the image stabilization is performed by feeding back the position signal of the image stabilizing lens output from the image stabilizing lens encoder 131 to the image stabilization controlling circuit 127. The image stabilizing control is performed for each of two axes around the camera body 101: a pitch axis for detecting a tilt in a vertical direction; and a yaw axis for detecting a tilt in a horizontal direction. For the image stabilization, the lens MPU 118 includes an image stabilizer 118a and a feedback controller 118b. Their functions will be described later.

The diaphragm 123 is driven via a diaphragm controlling circuit 132 and a stepping motor 133 in accordance with a controlling signal from the lens MPU 118. A switch (SW) 134 is configured for selecting ON/OFF of the lens image stabilization.

Figure 2:
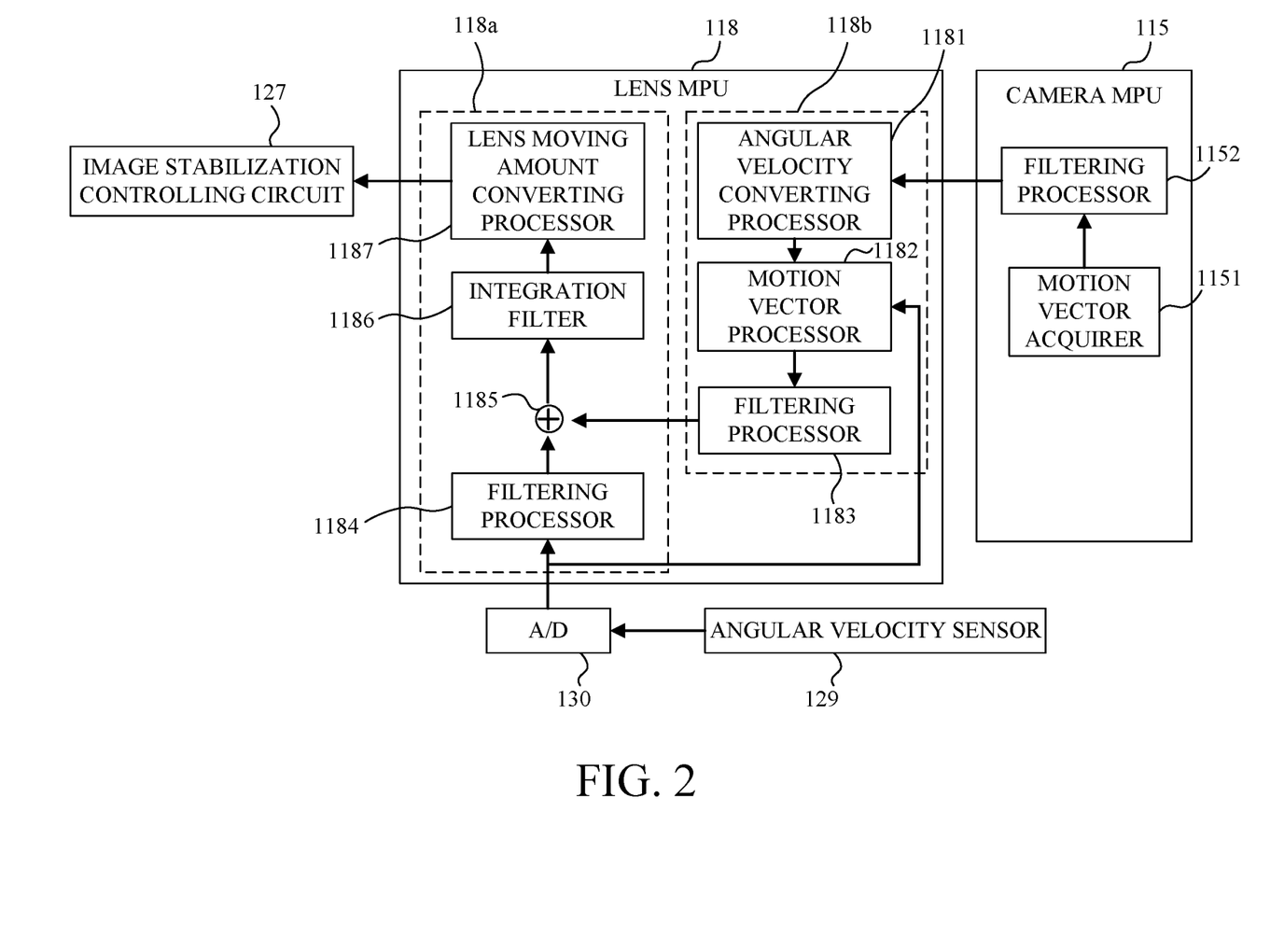
FIG. 2 is a block diagram illustrating a control apparatus according to a first embodiment.

Next, a flow will be described from when the camera MPU 115 acquires a motion vector to when the motion vector becomes a lens target signal for inputting to the image stabilization controlling circuit 127 of the interchangeable lens 102 in this embodiment with reference to FIG. 2. FIG. 2 is a block diagram illustrating the control apparatus.

The camera MPU 115 includes a motion vector acquirer 1151 and a filtering processor 1152. The motion vector acquirer 1151 acquires motion vector information from the image signal processing circuit 111. The filtering processor 1152 performs various filtering processing such as removing noise for the obtained motion vector information. The filtered motion vector information is input to the lens MPU 118 via the interface circuits 116 and 117.

The lens MPU 118 includes an angular velocity converting processor (first acquirer) 1181, a motion vector processor (second acquirer) (motion vector information controlling processor) 1182, filtering processors 1183 and 1184, an adder 1185, an integration filter 1186, and a lens moving amount converting processor 1187. The feedback controller 118b includes the angular velocity converting processor 1181, the motion vector processor 1182, and the filtering processor 1183. The image stabilizer (controller) 118a includes the filtering processor 1184, the adder 1185, the integration filter 1186, and the lens moving amount converting processor 1187.

The angular velocity converting processor 1181 of the lens MPU 118 converts the input motion vector information (image plane moving speed information) (first blur information) into angular velocity information. Subsequently, the motion vector processor 1182 performs motion vector information controlling processing. A detailed description will be given of the motion vector information controlling processing later. Thereafter, the filtering processor 1183 performs various filtering processing for removing the noise and for improving the accuracy of the image stabilization.

The blur signal (angular velocity signal) obtained by the angular velocity sensor 129 is converted into the digital signal through the A/D converter 130 and input to the lens MPU 118. The blur signal (second blur information) converted into the digital signal is input to the motion vector processor 1182. The filtering processor 1184 performs various filtering processing on the blur signal converted into the digital signal so as to remove the noise and improve the accuracy of the image stabilization. Subsequently, the adder 1185 adds the angular velocity signal (output signal from the filtering processor 1183) obtained based on the motion vector information and the angular velocity signal (output signal from the filtering processor 1184) obtained from the angular velocity sensor 129, and generates third blur information. The integration filter 1186 converts the added angular velocity signal into an angle signal.

Subsequently, the lens moving amount converting processor 1187 performs lens moving amount converting processing on the angle signal, and generates a target signal for moving the image stabilizing lens 122. As described above, the driving signal for driving the image stabilizing lens 122 is generated by calculating the difference between the target signal and the signal from the image stabilizing lens encoder 131, and is input to the image stabilization controlling circuit 127. Accordingly, it is possible to perform more accurate image stabilization by feeding back the blur residual (blur residual signal) obtained from the motion vector information to the driving signal for the image stabilizing lens 122.

Next, a description will be given of the motion vector information controlling processing in the lens MPU 118 (motion vector processor 1182) with reference to FIG. 3.

Figure 3:
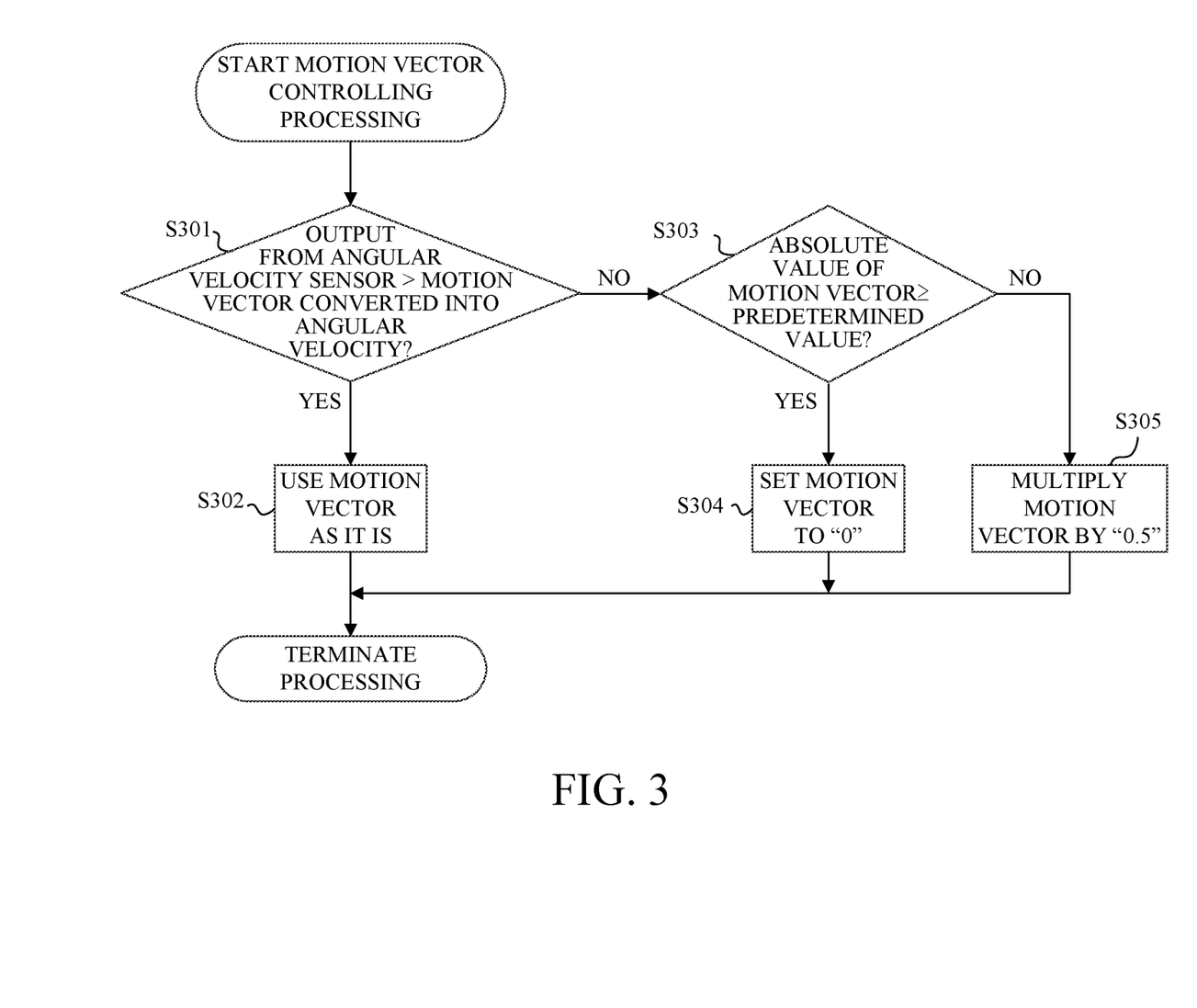
FIG. 3 is a flowchart describing motion vector information controlling processing according to the first embodiment.

FIG. 3 is a flowchart describing the motion vector information controlling processing. Each step in FIG. 3 is mainly executed by the feedback controller 118b (motion vector processor 1182) of the lens MPU 118. When the lens MPU 118 starts the motion vector information controlling processing, the process starts from the step S301.

First in the step S301, the lens MPU 118 (motion vector processor 1182) compares the blur amount indicated by the output signal (blur signal, angular velocity signal) from the angular velocity sensor 129 and the blur amount indicated by the motion vector (motion vector information) converted into the angular velocity. Since the motion vector information is the blur residual information, it is basically unlikely that the motion vector information indicates larger blur than actually occurring blur when the background motion vector is accurately detected. Thus, when the blur residual (blur residual signal) detected based on the motion vector is larger than actually occurring blur (that is, the blur signal from the angular velocity sensor 129), the lens MPU 118 determines that it is likely that the motion vector information is erroneously detected.

When, in the step S301, the blur amount indicated by the output signal from the angular velocity sensor 129 is larger than that of the motion vector information converted into the angular velocity, the process proceeds to the step S302. In the step S302, the lens MPU 118 uses the motion vector as it is. That is, the lens MPU 118 feeds back the blur residual calculated based on the motion vector to the image stabilizer 118a as it is.

On the other hand, when, in the step S301, the blur amount indicated by the output signal from the angular velocity sensor 129 is equal to or smaller than that of the motion vector converted into the angular velocity, the process proceeds to the step S303. In the step S303, the lens MPU 118 (motion vector processor 1182) determines whether the absolute value of the motion vector is equal to or larger than a predetermined value. When the absolute value of the motion vector is equal to or larger than the predetermined value, the process proceeds to the step S304. In the step S304, the lens MPU 118 sets the motion vector to 0, that is, sets the blur residual calculated based on the motion vector to 0, and feeds it back to the image stabilizer 118a. On the other hand, when the absolute value of the motion vector is smaller than the predetermined value, the process proceeds to the step S305. In the step S305, the lens MPU 118 multiplies the motion vector by 0.5, that is, multiplies the blur residual by 0.5 and feeds it back to the image stabilizer 118a.

If the motion vector information is fed back to the driving signal of the image stabilizing lens 122 as it is when the motion vector information is erroneously detected, the image stabilization may not be correctly performed, and the user may feel discomfort. Thus, when the feedback controller 118b (motion vector processor 1182) determines that the motion vector information is erroneously detected, the feedback controller 118b sets a smaller value than that of the motion vector information, not using the motion vector information as it is. Specifically, in this embodiment, when the absolute value is large, the motion vector is set to 0 in order to further reduce the value to be set. This is because the larger the value is of the motion vector fed back at the time of erroneous detection, the more largely the motion vector influences the driving signal for the image stabilizing lens 122.

As described above, this embodiment can properly control the motion vector information (blur residual signal) to be added as the driving signal for the image stabilizing lens 122 when it is likely that the motion vector has been erroneously detected. Further, this embodiment can make it smooth the signal displacement after the motion vector information controlling processing, by using the filtering processor 1183 at the later step of the motion vector information controlling processing.

Second Embodiment

Next, a description will be given of the second embodiment of the present invention with reference to FIGS. 4 and 5. This embodiment basically has the same configuration of the camera system as the configuration described with reference to FIG. 1, and thus a description thereof will be omitted.

Figure 4:
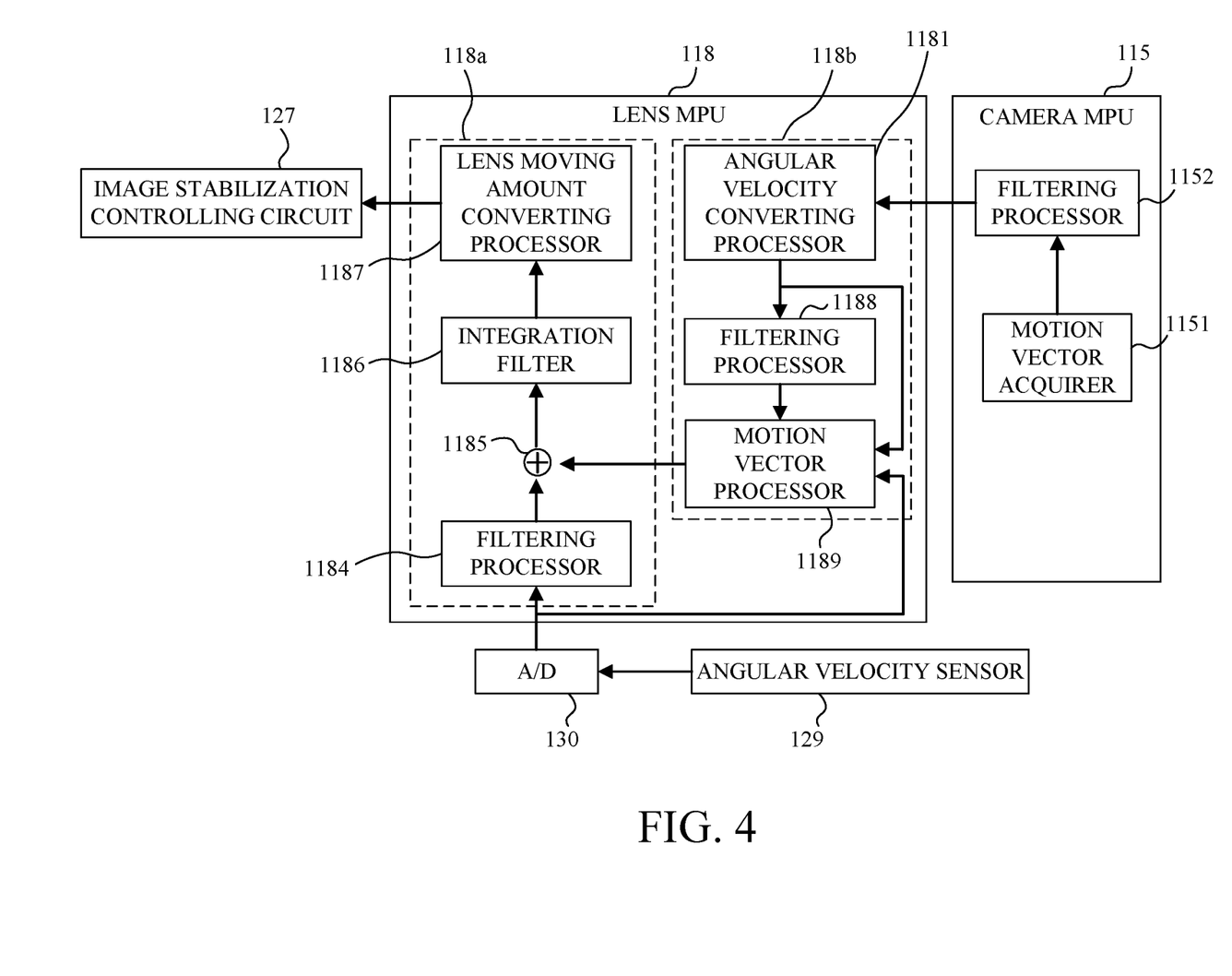
FIG. 4 is a block diagram illustrating a control apparatus according to a second embodiment.
Figure 5:
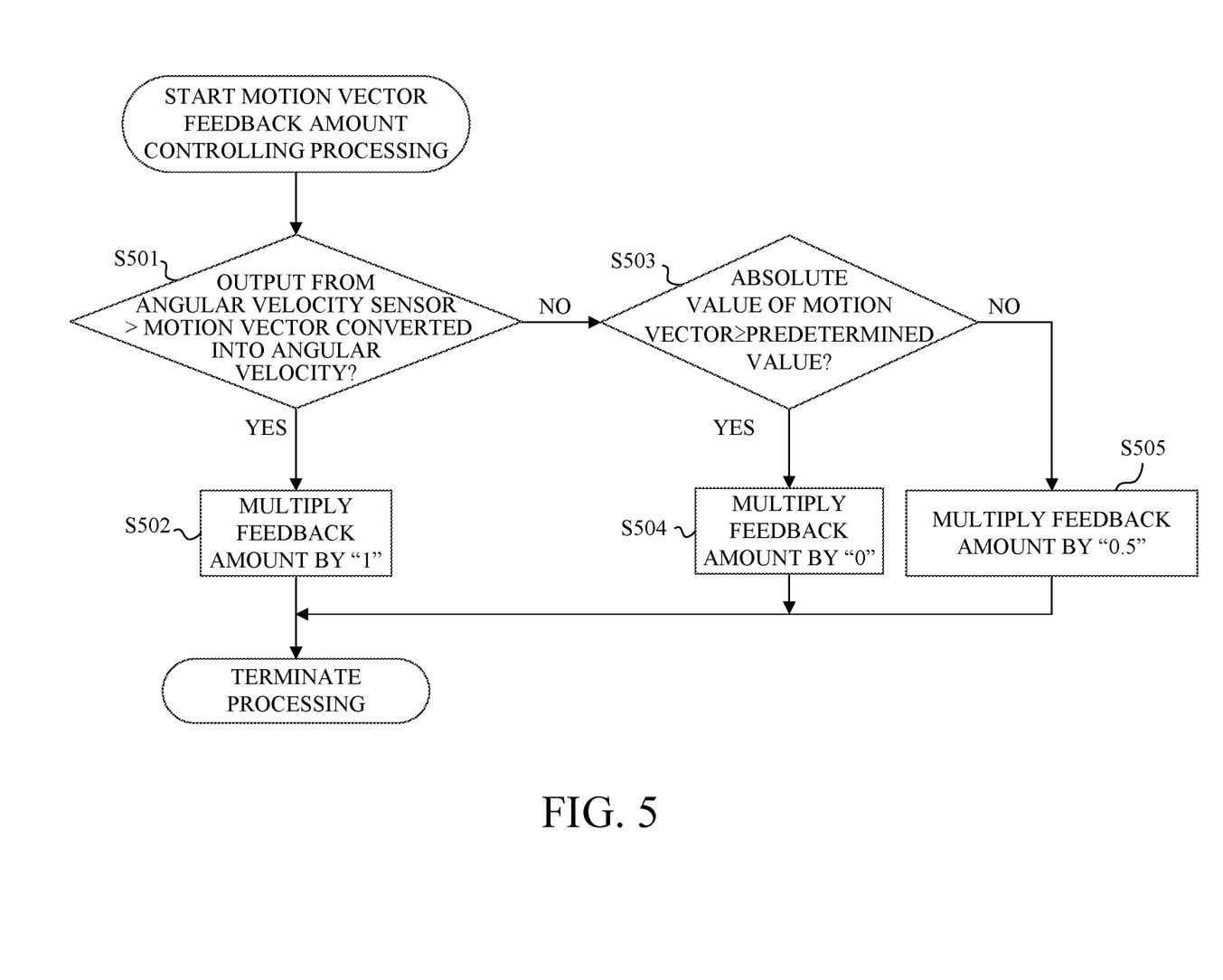
FIG. 5 is a flowchart describing motion vector feedback amount controlling processing according to the second embodiment.

With reference to FIG. 4, a flow will be described from when the camera MPU 115 acquires the motion vector to when the signal becomes the lens target signal for inputting to the image stabilization controlling circuit 127 of the interchangeable lens 102 in this embodiment. FIG. 4 is a block diagram illustrating the control apparatus.

The feedback controller 118b includes an angular velocity converting processor 1181, a filtering processor 1188, and a motion vector processor (second acquirer) (motion vector feedback amount controlling processor) 1189. The angular velocity converting processor 1181 is configured to convert the input motion vector information (image plane moving speed information) into the angular velocity information. The output signal (motion vector information converted into the angular velocity) from the angular velocity converting processor 1181 is also input to the motion vector processor 1189. Subsequently, the filtering processor 1188 performs various filtering processing for removing the noise and for improving the accuracy of the image stabilization. Thereafter, the motion vector processor 1189 performs the motion vector feedback amount controlling processing. A detailed description will be given of the motion vector feedback amount control processing later.

The blur signal obtained by the angular velocity sensor 129 is converted into the digital signal through the A/D converter 130 and input to the lens MPU 118. The blur signal converted into the digital signal is input to the motion vector processor 1189. The filtering processor 1184 performs various filtering processing on the blur signal converted into the digital signal so as to remove the noise and improve the accuracy of the image stabilization. Subsequently, the adder 1185 adds the angular velocity signal (output signal from the motion vector processor 1189) obtained based on the motion vector information and the angular velocity signal (output signal from the filter processor 1184) obtained from the angular velocity sensor 129. The integration filter 1186 converts the added angular velocity signal into the angle signal.

Subsequently, the lens moving amount converting processor 1187 performs the lens moving amount converting processing on the angle signal, and generates the target signal for moving the image stabilizing lens 122. As described above, the driving signal for driving the image stabilizing lens 122 is generated by calculating the difference between the target signal and the signal from the image stabilizing lens encoder 131, and is input to the image stabilization controlling circuit 127. Accordingly, it is possible to perform more accurate image stabilization by feeding back the blur residual (blur residual signal) obtained from the motion vector information to the driving signal for the image stabilizing lens 122.

Next, a description will be given of the motion vector feedback amount controlling processing in the lens MPU 118 (motion vector processor 1189) with reference to FIG. 5. FIG. 5 is a flowchart describing the motion vector feedback amount controlling processing. Each step in FIG. 5 is mainly executed by the feedback controller 118b (motion vector processor 1189) of the lens MPU 118. When the lens MPU 118 starts the motion vector feedback amount controlling processing, the process starts from the step S501.

First in the step S501, the lens MPU 118 (motion vector processor 1189) compares the blur amount indicated by the output signal (blur signal, angular velocity signal) from the angular velocity sensor 129 and the blur amount indicated by the motion vector (motion vector information) converted into the angular velocity.

When, in the step S501, the blur amount indicated by the output signal from the angular velocity sensor 129 is larger than that of the motion vector information converted into the angular velocity, the process proceeds to the step S502. In the step S502, the lens MPU 118 multiplies the feedback amount by 1. That is, the lens MPU 118 sets, to 1, the feedback amount of the blur residual calculated based on the motion vector and feeds it back to the image stabilizer 118a.

On the other hand, when, in the step S501, the blur amount indicated by the output signal from the angular velocity sensor 129 is equal to or smaller than that of the motion vector converted into the angular velocity, the process proceeds to the step S503. In the step S503, the lens MPU 118 (the motion vector processor 1189) determines whether the absolute value of the motion vector is equal to or larger than a predetermined value. When the absolute value of the motion vector is equal to or larger than the predetermined value, the process proceeds to the step S504. In the step S504, the lens MPU 118 multiplies the feedback amount by 0, that is, sets, to 0, the feedback amount of the blur residual calculated based on the motion vector, and feeds it back to the image stabilizer 118a. On the other hand, when the absolute value of the motion vector is smaller than the predetermined value, the process proceeds to the step S505. In the step S505, the lens MPU 118 multiplies the feedback amount by 0.5, that is, multiplies the feedback amount of the blur residual by 0.5, and feeds it back to the image stabilizer 118a.

As described above, this embodiment can properly control the motion vector information (blur residual signal) to be added as the driving signal for the image stabilizing lens 122, when it is likely that the motion vector has been erroneously detected. Further, this embodiment can earlier prevent, from being reflected, the erroneously detected motion vector information, by inserting the motion vector feedback amount controlling processing immediately before the addition of the angular velocity (adder 1155).

In each embodiment, the control apparatus (lens MPU 118) has the image stabilizer 118a and the feedback controller 118b. The image stabilizer 118a is configured to move the image stabilizing lens 122 in the direction including the component orthogonal to the optical axis based on the blur signal from the angular velocity sensor 129 and the motion vector calculated using the imaging signal from the imager 104. By moving the image stabilizing lens 122 in this manner, the image stabilizer 118a moves the position of the optical axis of the imaging optical system relative to that of the imager 104. The feedback controller is configured to feed back the blur residual (blur residual signal) calculated using the motion vector to the image stabilizer when the image stabilizer 118a moves the position of the optical axis.

The feedback controller is configured to change the feedback amount of the blur residual based on the blur signal and the motion vector.

The feedback controller may change the feedback amount based on each of the blur amount indicated by the blur signal and by the motion vector. The feedback controller may change the feedback amount based on each of the blur amounts indicated by the respective average values of the blur signal and of the motion vector during a predetermined period. The feedback controller may change the feedback amount based on whether the blur amount indicated by the blur signal (angular velocity signal) is larger than that of the motion vector converted into the angular velocity (S301, S501). The feedback controller may change the feedback amount based on whether the absolute value of the motion vector is larger than the predetermined value (S303, S503). The feedback controller may change the feedback amount based on each of frequencies of the blur signal and the motion vector.

The feedback controller may convert the motion vector into the angular velocity, control the motion vector converted into the angular velocity, and change the feedback amount (FIG. 2). The feedback controller may convert the motion vector into the angular velocity, perform the filtering processing, control the motion vector after the angular velocity conversion and after the filtering processing, and change the feedback amount (FIG. 4).

In each embodiment, the step S303 or the step S503 determines whether the absolute value of the motion vector is equal to or larger than the predetermined value, but the present invention is not limited to this. For example, when the blur amount indicated by the output signal from the angular velocity sensor 129 is smaller than that of the motion vector converted into the angular velocity, the motion vector may always be set to 0 (or the feedback amount is multiplied by 0). Alternatively, the motion vector may always be set to a constant value other than 0 (or the feedback amount may be multiplied by a constant value). The predetermined value for determining the absolute value of the motion vector may be divided and used in a plurality of stages, and the value to be multiplied may be controlled more finely. Further, for example, a gain may be calculated corresponding to the size of the motion vector and multiplied to the feedback amount.

Each embodiment compares the blur amount indicated by the output signal from the angular velocity sensor 129 and the blur amount indicated by the motion vector converted into the angular velocity, and determines whether the motion vector information is erroneously detected, but the present invention is not limited to this. Since the motion vector information is basically updated for each frame, the output signal from the angular velocity sensor 129 may be acquired in accordance with the update cycle and used for the comparison. From this, more accurate detection may be possible. The comparison may use the average value of the output signals from the angular velocity sensor 129 during the period (frame rate) for updating the vector. From this, even when a step-like output is generated from the angular velocity sensor 129 due to an impact or the like, the influence thereof may be reduced. The information for determining erroneous detection of the motion vector may be the relationship between the frequency of the output signal from the angular velocity sensor 129 and the frequency of the motion vector information. For example, when the blur frequency distribution detected by the angular velocity sensor 129 greatly differs from the blur residual frequency distribution based on the motion vector information, it may be determined that it is likely that the motion vector has been erroneously detected.

Each embodiment describes the configuration in which the image stabilization is performed by shifting the image stabilizing lens 122 of the interchangeable lens 102 in a direction orthogonal to the optical axis. However, the present invention is not limited to this. For example, the same effect as that in each embodiment may be obtained by using a configuration in which the image stabilization is performed by shifting the imager 104 of the camera body 101 in the direction orthogonal to the optical axis. Further, if each of the camera body 101 and the interchangeable lens 102 has an optical image stabilizing mechanism, it is possible to stabilize an image having even larger blur by assigning the image stabilizing amount.

In each embodiment, the lens MPU 118 as the control apparatus includes the image stabilizer 118a and the feedback controller 118b, but the present invention is not limited this. The camera MPU 115 as the control apparatus may include at least part of functions as the image stabilizer and the feedback controller. Each embodiment describes a configuration in which the interchangeable lens 102 has the angular velocity sensor (blur detector) 129, but a similar angular velocity sensor may be provided in the camera body 101 instead of the interchangeable lens 102. Alternatively, an angular velocity sensor may be provided in each of the camera body 101 and the interchangeable lens 102, and at least one of the output signals from both angle sensors may be used. When the output signals from both angular velocity sensors are used, an average value of the outputs from the angular velocity sensors provided in the camera body 101 and the interchangeable lens 102 may be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a control apparatus, a lens apparatus, an imaging apparatus, a control method, and a storage medium each of which can perform highly accurate image stabilization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-091070, filed on May 14, 2019 which is hereby incorporated by reference herein in its entirety.

What is claimed is:

1. A control apparatus comprising:
    a first acquirer configured to acquire first blur information based on a motion vector calculated using an imaging signal from an image sensor;
    a second acquirer configured to acquire second blur information based on a blur signal from a blur detector; and
    a controller configured to control driving of an image stabilizing element in accordance with third blur information obtained by using the first blur information and the second blur information,
    wherein a weight for the first blur information in acquiring the third blur information is determined based on a comparison between a frequency characteristic of the first blur information and a frequency characteristic of the second blur information.

2. The control apparatus according to claim 1, wherein the blur detector is an angular velocity sensor.

3. The control apparatus according to claim 1, wherein the blur signal is an angular velocity signal.

4. A lens apparatus comprising:
    an imaging optical system; and
    the control apparatus according to claim 1.

5. The lens apparatus according to claim 4, further comprising the blur detector configured to detect a blur and to output the blur signal.

6. The lens apparatus according to claim 4, wherein that the controller moves an image stabilizing lens included in the imaging optical system, which is the image stabilizing element, in a direction including a component orthogonal to an optical axis.

7. An imaging apparatus comprising:
    an image sensor configured to photoelectrically convert an optical image formed via an imaging optical system and to output an imaging signal; and
    the control apparatus according to claim 1.

8. The imaging apparatus according to claim 7, further comprising a vector calculator configured to calculate the first blur information by using the imaging signal from the image sensor.

9. The imaging apparatus according to claim 7, wherein the controller moves a position of the image sensor, which is the image stabilizing element, in a direction orthogonal to an optical axis.

10. The control apparatus according to claim 1, wherein the controller acquires the third blur information by combining the blur information based on the first blur information and the blur information based on the second blur information.

11. The control apparatus according to claim 1, wherein when a blur amount indicated by the first blur information is larger than a blur amount indicated by the second blur information, the weight is smaller than that when the blur amount indicated by the first blur information is smaller than the blur amount indicated by the second blur information.

12. The control apparatus according to claim 11, wherein when the blur amount indicated by the first blur information is larger than the blur amount indicated by the second blur information and the blur amount indicated by the first blur information is a first blur amount, the weight is smaller than that when the blur amount is a second blur amount smaller than the first blur amount.

13. The control apparatus according to claim 11, wherein the blur amount indicated by the first blur information and the blur amount indicated by the second blur information are respectively determined based on an average value of the first blur information and an average value of the second blur information during a predetermined period.

14. The control apparatus according to claim 1, wherein the motion vector is calculated based on the imaging signal obtained with the image stabilizing element moved, the motion vector representing a blur residual.

15. A control apparatus comprising:
    a first acquirer configured to acquire first blur information based on a motion vector calculated using an imaging signal from an image sensor;
    a second acquirer configured to acquire second blur information based on a blur signal from a blur detector; and
    a controller configured to control driving of an image stabilizing element,
    wherein, in accordance with a result of a comparison between the first blur information and the second blur information, the controller performs a first control for driving the image stabilizing element based on third blur information obtained by using the first blur information and the second blur information, or performs a second control for driving the image stabilizing element based on the second blur information, and
    wherein a weight for the first blur information in obtaining the third blur information is determined based on a comparison between a frequency characteristic of the first blur information and a frequency characteristic of the second blur information.

16. The control apparatus according to claim 15,
    wherein the controller performs the first control when a blur amount indicated by the second blur information is larger than a blur amount indicated by the first blur information, and
    wherein the controller performs the second control when the blur amount indicated by the second blur information is smaller than the blur amount indicated by the first blur information.

17. A control method comprising:
    a first acquiring step of acquiring first blur information based on a motion vector calculated using an imaging signal from an image sensor;
    a second acquiring step of acquiring second blur information based on a blur signal from a blur detector; and
    a correcting step of controlling driving of an image stabilizing element in accordance with third blur information obtained by using the first blur information and the second blur information,
    wherein the correcting step determines a weight for the first blur information at the time of acquiring the third blur information, the determination based on a comparison between a frequency characteristic of the first blur information and a frequency characteristic of the second blur information.

18. A non-transitory computer-readable storage medium storing a computer program that causes a computer to execute the control method according to claim 17.

\* \* \* \* \*